US011237693B1

(12) United States Patent
Tamir

(10) Patent No.: US 11,237,693 B1
(45) Date of Patent: Feb. 1, 2022

(54) PROVISIONING SERENDIPITOUS CONTENT RECOMMENDATIONS IN A TARGETED CONTENT ZONE

(71) Applicant: Outbrain Inc., New York, NY (US)

(72) Inventor: Ido Tamir, Kadima-Zoran (IL)

(73) Assignee: Outbrain Inc., New York, NY (US)

( * ) Notice: Subject to any disclaimer, the term of this patent is extended or adjusted under 35 U.S.C. 154(b) by 0 days.

(21) Appl. No.: 17/109,857

(22) Filed: Dec. 2, 2020

(51) Int. Cl.
*H04L 29/08* (2006.01)
*G06F 3/0481* (2013.01)

(52) U.S. Cl.
CPC ............ *G06F 3/0481* (2013.01); *H04L 67/22* (2013.01)

(58) Field of Classification Search
CPC .. G06F 3/0481; G06F 3/0485; G06F 3/04886; H04L 67/22
See application file for complete search history.

(56) References Cited

U.S. PATENT DOCUMENTS

| 2014/0081977 | A1* | 3/2014 | Kapur | G06Q 30/0269 707/738 |
|---|---|---|---|---|
| 2016/0224557 | A1* | 8/2016 | Chi | G06F 40/186 |
| 2017/0124590 | A1* | 5/2017 | Griesmeyer | H04L 67/02 |
| 2020/0167433 | A1* | 5/2020 | Karayev | G06N 3/08 |
| 2020/0192951 | A1* | 6/2020 | Singhal | G06F 16/908 |

OTHER PUBLICATIONS

Gregory Senay et al., A segment-Level Confidence Measure for Spoken Document Retrieval, May 1, 2011, IEEE, pp. 5548-5551 (Year: 2011).*
Antoon Dimitrov et al., Topick: Accurate Topic Distillation for User Streams, Dec. 1, 2012, IEEE Computer Society, pp. 882-885 (Year: 2012).*

* cited by examiner

*Primary Examiner* — Tam T Tran
(74) *Attorney, Agent, or Firm* — Lowenstein Sandler LLP

(57) ABSTRACT

A content recommendation method and system are described, according to various implementation. In an implementation, the method and system generate a record identifying a set of content items interacted with by users of a content system, where each content item is associated with one or more topics. A confidence score associated with each of a set of topics associated with the set of content items is generated, where the confidence score represents a quantity of instances a respective topic appears in a collection of content items. A portion of the set of topics having a confidence score that exceeds a threshold confidence level is determined. A search of the collection of content items is executed to identify a serendipitous candidate content item that includes multiple portions of the set of topics previously interacted with by a user. The method and system determines, based on the record, that the candidate serendipitous content item has not been interacted with by the user system. The method and system generates a plurality of content zones having a depth defined based on user engagement measurements, wherein the plurality of content zones includes a targeted content zone including the candidate serendipitous content item.

20 Claims, 7 Drawing Sheets

FIG. 4

Content Network (Collection of Content Items)

| Content Item Topic | Confidence Score | High Confidence Score |
|---|---|---|
| Content Item Topic 1 | 54 | No |
| Content Item Topic 2 | 88 | Yes |
| Content Item Topic 3 | 19 | No |
| Content Item Topic 4 | 67 | No |
| Content Item Topic 5 | 42 | No |
| Content Item Topic 6 | 92 | Yes |
| Content Item Topic 7 | 29 | No |
| Content Item Topic 8 | 73 | No |
| Content Item Topic 9 | 49 | No |
| Content Item Topic 10 | 37 | No |

PROVISIONING SERENDIPITOUS CONTENT RECOMMENDATIONS IN A TARGETED CONTENT ZONE

TECHNICAL FIELD

The present disclosure relates to content recommendation networks, and more particularly, to provisioning targeted content recommendations to users in an electronic environment.

BACKGROUND

In the electronic content publishing industry, it is desirable for a content publisher (e.g., a website provider) to present users not only with the publisher's native content in an initial form (e.g., a webpage), but also provide users (e.g., visitors to the content publisher's website or digital outlet) with additional "recommended" content. In this regard, it should be a goal of the content publisher to provision personalized content recommendations that are interesting, trustworthy, and relevant to the user. This will have the effect of increasing the user's consumption of the recommended content, achieving a higher level of overall user engagement with the publisher's content, while increasing the content publisher's total revenue.

Conventional content recommendations can be provisioned to a user via a content feed or digital platform. The content feed can have a number of content recommendations that are presented or placed within an electronic display in a manner that drives the consumption by the user. It has been noticed in the digital content publishing industry that the user content consumption experience degrades rapidly after an initial batch of recommendations have been provisioned and presented to the user. In this regard, as a user reviews the set of content recommendations (e.g., scrolls down through the set of recommendations), a diminishing rate of user engagement is evident.

Despite this unengaging experience, users typically continue to scroll down to "barren" recommendation zones, continuing deeper into the content feed, as is seen from implicit user scroll depth data. However, these deeper "dead" content recommendation zones (e.g., areas of the recommendation feed that are further down a webpage or digital interface) are not currently optimized or monetized for user engagement and content publisher lifetime revenue. Conventional collaborative filtering techniques are limited to provisioning a set of related content recommendations that are similar and related to one another. Accordingly, conventional content recommendation systems provision an entire set of content recommendation that, due to their similarity, create fatigue and lack of engagement by the users. As such, these techniques are unable to surprise the user with "serendipitous" recommendations that user would not have discovered otherwise.

BRIEF DESCRIPTION OF THE FIGURES

The present disclosure will be understood more fully from the detailed description given below and from the accompanying drawings of various implementations of the disclosure.

FIG. 4 is a table including an example portion of a content network including a set of content item topics and corresponding confidence scores generated by a content recommendation system, in accordance with one or more embodiments of the present disclosure.

DETAILED DESCRIPTION

Figure 1:
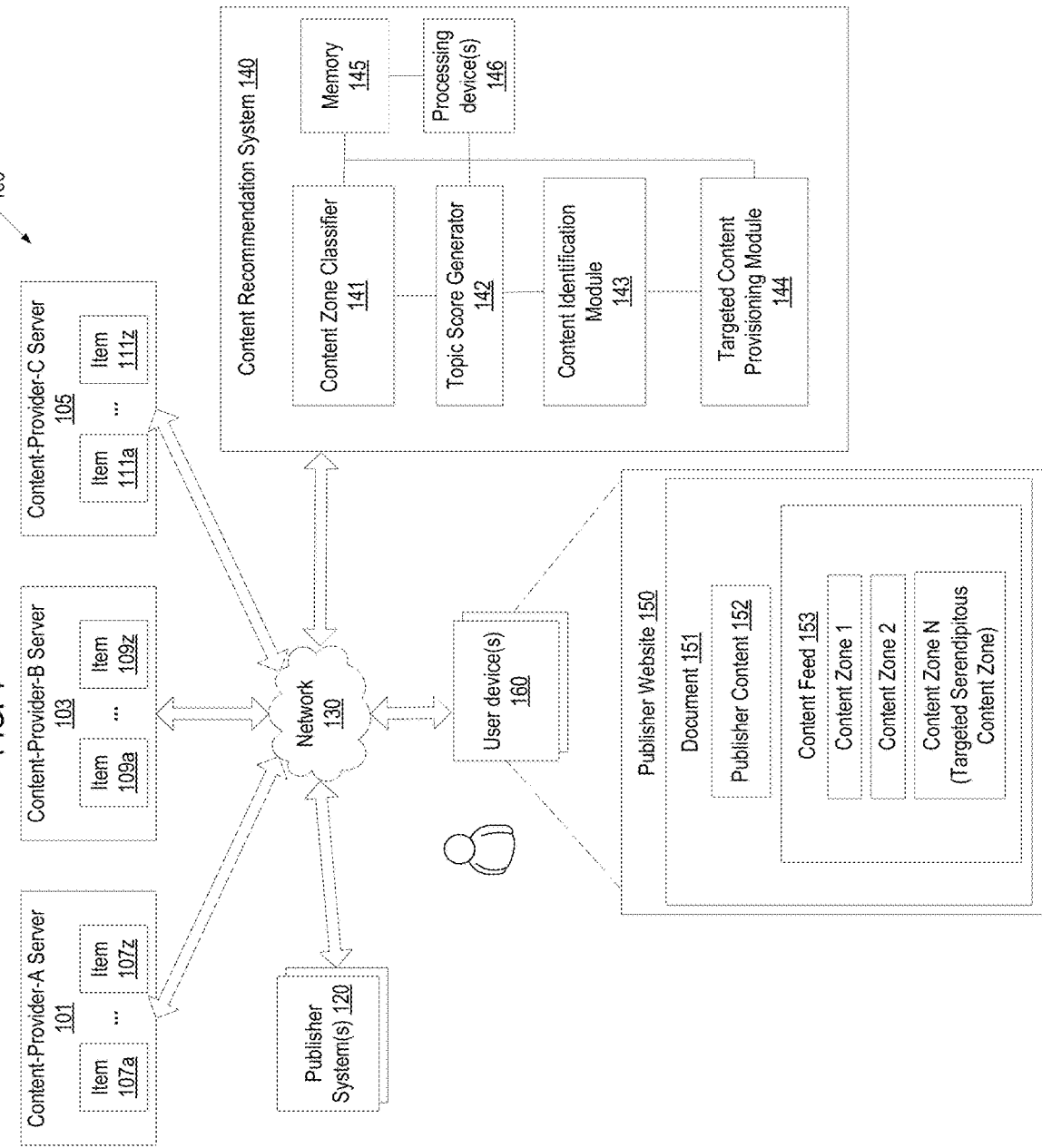
FIG. 1 illustrates an example system architecture including a content recommendation system, in accordance with one or more embodiments of the present disclosure.

A content recommendation provisioning method and system are described, according to various implementations. The content recommendation provisioning system (herein the "content recommendation system") is configured to identify and generate one or more selected content recommendations to provision via a digital document having a content recommendation feed portion including multiple content recommendation zones. The content recommendation feed portion may include an area of the digital document that is configured to display a set of content recommendations generated and provisioned by the content recommendation system.

A content recommendation zone is a portion of the digital document that is designated for the provisioning of a content recommendation feed. The content recommendation zone of the digital document may include a first content zone, a second content zone, a third zone, etc. For example, the first content zone can be positioned at a topmost portion of a digital document and be an "initial" or "first" zone a user interacts with when scrolling though the set of content recommendations of the content recommendation feed, following by the second content zone within the scrolling depth, and so on.

According to embodiments, the content recommendation system establishes the multiple content zones and selects a set of one or more content recommendations to provision via each of the multiple content zones. In an embodiment, the content recommendation system classifies each content zone by a zone type (e.g., a semi-personalized or personalized zone type, a best of network zone type, a serendipity zone type, etc.). The content recommendation system determines a set of content recommendations to assign to each of the content zones based on the corresponding zone type. For example, the first content zone may be designated as a first type of zone, also referred to as a "semi-personalized zone" or "personalized zone". In view of the zone type, the content recommendation system identifies a first set of content recommendations that satisfy a set of criteria corresponding to the semi-personalized zone. In this example, the second content zone (e.g., the zone that follows the first zone in the scroll depth), may be designated as second zone type (also referred to as a "best of network" zone) configured to include a second set of content recommendations that satisfy a set of criteria corresponding to the best of network zone.

Advantageously, the content recommendation system can identify a further content zone type referred to as the "serendipity zone" or "targeted zone". In an embodiment, the targeted zone can be identified as a portion of the content feed corresponding to a decreased level of user engagement as measured by user engagement signals collected and stored by the system. In an embodiment, the content recommendation system identifies a location or depth in the content feed corresponding to an aggregated user engagement signal level that is below a threshold level. In this regard, the serendipity zone is identified as a portion of the content feed that is historically neglected by users. To maximize user engagement for content recommendation served in the serendipity zone, the content recommendation system identifies one or more candidate content items that include a set of topics identified as being of interest to a user based on prior engagement levels and that have not previously been interacted with by the user system. In this regard, the content recommendation system generates interesting and surprising personalized recommendations in a zone of the content feed that is associated with a historically measured reduction in engagement.

In an implementation, the content recommendation system may include one or more software component (e.g., a set of instructions residing in a memory) executable by one or more processing devices to identify the zones of the content feed, generate one or more candidate content items satisfying criteria or conditions associated with a serendipitous recommendation, and provision the identified content items in the serendipity or targeted zone, as described herein in connection with FIGS. 1-7.

FIG. 1 illustrates an example system environment 100 in which examples of the present disclosure can be implemented. The system environment 100 can include one or more target user devices 160, one or more content provider servers 101, 103, 105, one or more publisher systems 120, and content recommendation system 140 coupled to each other via one or more networks 130.

According to embodiments of the present disclosure, the content recommendation system 140 include a content zone classifier 141, a topic score generator 142, a content identification module 143, and a targeted content provisioning module 144 configured to execute the steps, functions, and features of the present disclosure, as described herein. The components of the content recommendation system 140 may include set of instructions or programs configured to be stored in memory 145 and executable by one or more processing devices 146.

In an embodiment, the content recommendation system 140 identifies multiple content zones (e.g., content zone 1, content zone 2, and content zone N (also referred to as a "targeted serendipitous content zone") of FIG. 1 for document 151 provisioned to a user device 160 by a publisher system 120 via a publisher website 150. In an embodiment, the content zone classifier 141 of the content recommendation system 140 identifies a portion or area of the document 151 that is designated for display of a content feed 153 including multiple recommended content items. The content zone classifier 141 designates a first portion of the content feed 153 as a first content zone (e.g., content zone 1) and classifies the first content zone for provisioning a first type of content items. In an embodiment, the first content zone can include the first type of content items that satisfy a first set of criteria or conditions.

In an embodiment, the first content zone can display content items that are personalized or semi-personalized content items (herein referred to as "personalized content items"). Personalized content items can be defined as those related content items recommended to the user by directly processing content system data on a user's recorded taste, interest or affinity measure. Semi-personalized content items can be defined as those content items recommended to the user by using content system data on a user's recorded taste, interest or affinity measure as just one of the signals or measures used to calculate the content recommendations to be served to the user. In an implementation, the content recommendation system can generate and manage a user profile for each of multiple users within an electronic data environment (e.g., the Internet). The user profile may include information identifying content consumed by the user based at least in part on information collected by an associated tracking cookie (also referred to as the "user activity"). The multiple user profiles and corresponding user activity may be used to map and store aggregated data relating to user content consumption activities, interests and preferences across multiple content networks.

Figure 3:
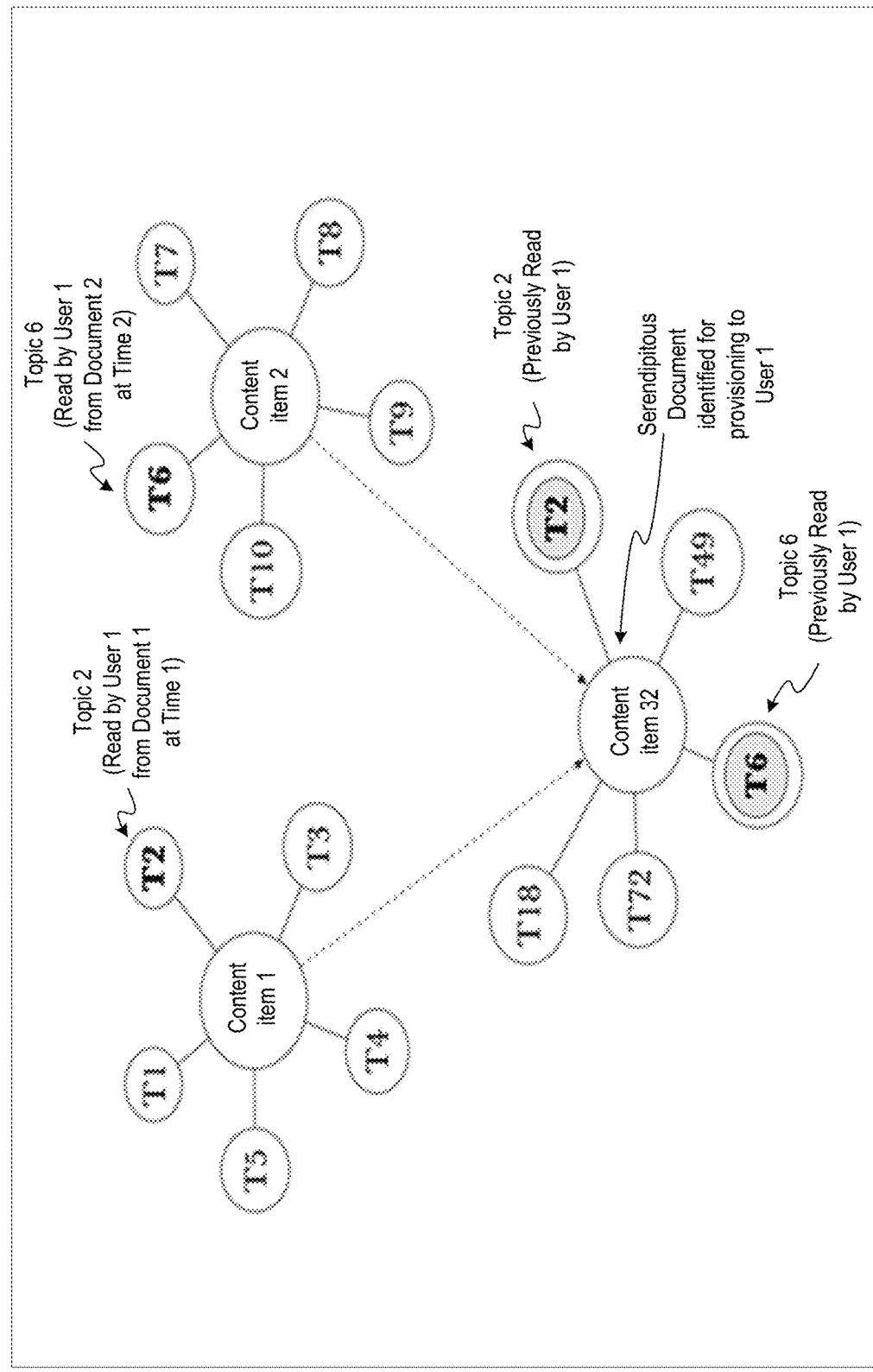
FIG. 3 illustrates a portion of a user profile including a portion of a user interest graph, in accordance with one or more embodiments of the present disclosure.

In an embodiment, the topic score generator 142 may analyze each user profile including historical data associated with a user's interactions with content items and generate a user interest graph populated by topics (e.g., content categories, websites, entities, user behavior clusters, expert content, etc.). The topic score generator 142 can extract a set of topics from the content item consumption history associated with a user. An example user interest graph associated with a user profile associated with an example user (e.g., User 1) is shown in FIG. 3. As shown in FIG. 3, the user profile includes information relating to a first content item (e.g., Content item 1) and a second content item (e.g., Content item 2) previously consumed (e.g., accessed and read by the user). For each document, the topic score generator 142 extracts and identifies a set of topics associated with the content item (e.g., Content item 1 read from Document 1 at Time 1 by User 1 has five topics (T1, T2, T3, T4, T5) and Content item 2 read by User 1 from Document 2 at Time 2 has five topics (T6, T7, T8, T9, T10)).

In an embodiment, the topic score generator 142 generates and assigns a confidence score relating to every content item topic or category in a content network (e.g., a collection of content items). In an embodiment, the confidence score of a topic or category is represented as a sum value of a number of instances that the topic appears in the collection of content items of the content network. In an embodiment, each content item in the content network is indexed for topics and categories, and are assigned a corresponding confidence score.

FIG. 4 illustrates an example table including confidence scores associated with multiple content item topics of the content network associated with the user in the example shown in FIG. 3. As shown, the content items associated with Content item 1 and Content item 2 (previously consumed by User 1) are identified (e.g., content item topic 1, content item topic 2 . . . content item topic 10) along with a generated confidence score.

In an embodiment, the content identification module 143 can be configured to identify a set of personalized content items and topics to provision in a first content zone designated as a personalized content zone (e.g., a content zone 1 of FIG. 1). A personalized content item can be identified based on information associated with a user stored in a user profile. In an implementation, the content recommendation system 140 is configured to analyze information associated with the user (e.g., user device 160) to which the document 151 is being provisioned. In an embodiment, the content recommendation system 140 identifies or generates one or more personalized content recommendations from content item pools (e.g., including content items from content providers 101, 103, 105, etc.) for each user across multiple content serving locations and content usage profiles.

In an embodiment, a personalized content item can be a content item having a topic that has a personalized score based on the user graph and related information associated with the user profile. In an embodiment, a content item can be identified as a personalized content item for provisioning in content zone 1 if a personalized score associated with the content item satisfies a first condition or set of conditions defining a personalized content item. In an embodiment, a content item is identified as a personalized content item if the associated personalized score exceeds a threshold personalized score level, indicating that the content item is a suitable fit for the user in view of the user profile information.

In an embodiment, the content identification module 143 can be configured to identify a set of best of network content items and topics to provision in a second content zone designated as a best of network content zone (e.g., content zone 2 of FIG. 1). In an embodiment, best of network content items can be determined by calculating a cross-network or global score for each content recommendation provided throughout the content network (e.g., multiple publisher websites) according to the following:

$$\frac{\text{number of clicks on each content recommendation across the network}}{\text{number of impressions of that content recommendation across the network}}$$

In an embodiment, choosing an nth percentile (e.g., 95th percentile) of the scored cross-network content recommendations results in a list of content recommendations that are considered to be best of network content recommendations.

In an embodiment, the content identification module 143 identifies one or more content items from a set of best of network content items. A best of network content item can be identified as a content item having a confidence score (as determined by the topic score generator 142) that satisfies one or more conditions defining a best of network content item (e.g., the confidence score exceeds a best of network confidence score threshold level). In an embodiment, the best of network content item can be a content item having a topic of interest to the user (as determined by analyzing the user profile information) that has a confidence score that exceeds the best of network confidence score threshold level.

In an embodiment, the content identification module 143 can be configured to identify a set of targeted or serendipitous content items and topics to provision in a subsequent content zone of the content feed (e.g., a third content zone designated as a targeted zone (e.g., content zone 3 of FIG. 1).

In an embodiment, the content identification module 143 identifies one or more content items for provisioning in the targeted content zones by identifying a content item including multiple topics each having a confidence score that exceeds a confidence score threshold level (e.g., a high confidence score threshold level), where the content item has not previously been consumed or interacted with by the user, as described in greater detail below. Accordingly, the content identification module 143 can identify a targeted content item (e.g., a document, a video, an image, a sound file, etc.) satisfying the following criteria: 1) the content item includes two or more topics having a confidence score that exceeds a high confidence score threshold level and 2) the user (e.g., the user device 160) has not previously interacted with the content item (e.g., the targeted content item does not appear in a historical record of interactions of the user profile (e.g., the user has not yet consumed the targeted content item). An example of the targeted serendipitous content item is Content item 32, shown in FIG. 3.

In an embodiment, the content identification module 143 identifies the multiple sets of content items (e.g., articles, images, videos, etc.) corresponding to respective zones of the content feed. The respective sets are identified and optimized in accordance with criteria corresponding to one of the multiple content zones (e.g., personalized or semi-personalized zone, a best of network zone, and a targeted serendipitous zone). The identified sets of content items for each of the content zones of the content feed 153 are provisioned for display via the document 151 by the content item provisioning module 144.

In an embodiment, the content items that are identified, scored and provisioned can be collected, received, retrieved from, or otherwise obtained from the one or more content providers 101, 103, 105 of FIG. 1. In an embodiment, the content items (e.g., candidate content items 107a-107z, 109a-109z, 111a-111z) can be provisioned for display via a publisher website 150 in a digital document (e.g., document 151) by the content item provisioning module 144. A document 151 may be, for example and not limited to, a website homepage, section front, webpage, digital display, mobile application user interface (UI), gaming application UI, television application UI, digital watch UI, etc. For example, a content provider 101, 103, 105 may have multiple candidate content recommendations 107a-107z, 109a-109z, 111a-111z that the content provider makes available for provisioning to a target user (e.g., user device 160) via a document 151 (e.g., SportsNews webpage, a BaseballNews webpage) of a publisher system 120. A content item 107a-107z, 109a-109z, 111a-111z can be a representation of digital content. Digital content can include, for example, such as, and not limited to, an article, a web blog entry, a social media posting, a data feed, an advertisement, a document (e.g., webpage), digital video, digital movies, digital photos, digital music, social media updates, electronic books (ebooks), electronic magazines, digital newspapers, digital audio books, electronic journals, electronic comic books, software applications, electronic watches, etc. Each content provider can have multiple candidate content items 107a-107z, 109a-109z, 111a-111z considered by a content recommendation provisioning module 144 of a third-party content recommendation system 140 as a candidate for provisioning to one or more target users.

A content recommendation host or "publisher" hereinafter refers to an entity and platform hosting destination documents (e.g., webpages, mobile application graphical user interfaces (GUIs), gaming application GUIs, television application GUIs, digital watch GUIs, etc.) that include content recommendations 107a-107z, 109a-109z, 111a-111z of the content providers 101, 103, 105. For example, SportsNews, Inc. and BaseballNews, Inc. may be publishers. The publisher platforms can include publishing servers 120. The publisher systems 120 can be application servers that provide one or more applications (e.g., web applications, mobile applications, desktop applications, gaming console applications, television console applications, digital watch applications, etc.). The publishing systems 120 can be coupled to one or more data stores that store publisher data and/or content recommendations of content providers.

According to implementations, the publisher website 150 can include one or more documents 151 can be rendered with the content recommendations 107a-107z, 109a-109z, 111a-111z of the content providers in user devices using for example, an application (e.g., web browser, mobile application, desktop application, gaming application, television application, digital watch application, etc.) on the user device.

In an embodiment, a document 151 can be within a publisher website 150. The publisher website 150 can be provisioned via a source system (e.g., a publisher system 120) and may include, but is not limited to, a publisher's website, a publisher's mobile application, publisher's gaming application, publisher's television application, publisher's digital watch application, etc. The document 151 can include publisher content 152 (e.g., native content generated by the publisher system 120) and the content feed 153 including multiple content zones. For example, the SportsNews website (e.g., publisher website 150) can include a webpage (e.g., document 151) that contains an article about a baseball game (e.g., publisher content 152) and a content feed 153 including a first content zone designated for personalized content items, a second content zone designated for best of network content items, and a third content zone designated for targeted or serendipitous content items.

In an embodiment, the content providers 101, 103, 105 can use the service hosted by the third party content recommendation service provider to have the content recommendations 107a-107za-107a-107zz, 109a-109z, 111a-111z of the content providers served to populate the content recommendation opportunities in the publisher website 150. The publishers (e.g., SportsNews Inc., BaseballNews, Inc.) can use the service hosted by the third party content recommendation service provider to receive content recommendations 107a-107z, 109a-109z, 111a-111z to populate the content feed 153.

In an embodiment, the content recommendation system 140 can host include one or more computing devices (e.g., servers) to provide the content recommendation provisioning services to the content providers and publishers. The content recommendation system 140 and components thereof can be software components (e.g., one or more sets of instructions residing in a memory) executable by one or more processing devices to perform the content zone management and provisioning functions described herein. The instructions of the content recommendation system 140 may reside in a memory (e.g., memory 145) including any suitable computer readable storage medium, such as volatile memory devices (e.g., random access memory (RAM), non-volatile memory devices (e.g., flash memory), a magnetic hard disk, a Universal Serial Bus (USB) solid state drive, a local disk, an external disk, and/or other types of memory devices).

The network of content providers can include, for example, several hundred thousand candidate content recommendations 107a-107z, 109a-109z,111a-111z that may be stored in one or more data stores that are coupled to the network 130. The architecture 100 can include, for example, multiple publisher websites 150 that are accessed by multiple users on various user devices 160.

The network 130 can include one or more local area networks (LAN), one or more wireless networks, one or more mobile communications networks, one or more wide area networks (WAN), such as the Internet, or similar communication systems, or combinations of such. The networks 130 can include one or more networking and/or computing devices such as wired and wireless devices. In one implementation, not all servers 101,103,105,120,140, and/or user devices 160A-B-C are directly connected to each other. The networks 130 may be separate networks.

In an embodiment, the user devices 160 can be a computing device such as a server computer, a desktop computer, a set-top box, a gaming console, a television, a portable computing device such as, and not limited to, mobile telephones, personal digital assistants (PDAs), portable media players, netbooks, laptop computers, an electronic book reader, wearable electronic devices and the like. For example, a user device may be a laptop computer, a tablet computer, a smartphone or a digital watch.

In an embodiment of the present disclosure, the user profile and an associated tracking cookie are used to track, map and store user data relating to a user's electronic or web-based content consumption across the web and multiple devices associated with the user. The user cookie tracks the user's implicit usage (e.g., documents actually read by the user) and provides data about the user's explicit choices (e.g., a user's choice of one or more content recommendation scopes). In an implementation, the user cookie may also be used to store the user's profile, including data about content the user has read and liked. In an implementation the user's tracked content consumption data can be mapped and stored as a profile graph indicating the content items and topics consumed by the user, as shown in FIG. 3.

In an implementation, to ensure the user's privacy, the cookie may not include any personally identifying information. A UUID (universally unique identifier) number is generated and assigned to the user tracking cookie and is subsequently reused (rewritten to the user's cookie) by the user content identity profile upon user registration.

In an implementation, the user may register with the system. Registering with the system provides the user with a consistent reading experience across the web, devices, geographical location, and time of day. For example, duplicate content recommendations to the same user may be avoided if a user is registered and/or logged in to the system. In an implementation, registration also enables the user to be notified about and sign up for additional content recommendation services. In another embodiment, the user profile data can be stored on and accessed from a secure third party content recommendation server. In another embodiment the user can login to the personalized hub homepage using a third-party user identity (e.g., a facebook.com or twitter.com user login).

According to embodiments of the present disclosure, the content recommendation system 140 and components (e.g., the content zone classifier 141, the topic score generator 142, the content identification module 143, and the content item provisioning module 144) may be combined or divided. The content recommendation system 140 can be coupled to one or more data stores that store data. In an embodiment, the data stores can be persistent storage units. A persistent storage unit can be a local storage unit or a remote storage unit. Persistent storage units can be a magnetic storage unit, optical storage unit, solid-state storage unit, electronic storage unit (main memory), or a similar storage unit. Persistent storage units can be a monolithic device or a distributed set of devices. A 'set', as used herein, refers to any positive whole number of items, including one.

The data stores can store input and/or output data. The components of the content recommendation system 140 can be coupled to the one or more data stores and can read from and write to the one or more data stores. The data stores can hold candidate content recommendation pools including multiple content items. According to implementations of the present disclosure, the content items can include, for example, and is not limited to, one or more text, links, thumbnails, images, icons, videos, etc.

According to implementations of the present disclosure, the data stores can store user data and user profiles for use by the content recommendation system 140. The user data may include user action data, user non-action data and user property data. The user data may be collected for any quantity of users via any suitable methodology. For example, user-specific data from multiple users may be collected by the user identity profile sub-module by storing a user identifier (e.g., a cookie stored on the user's browser) and/or using a user login (e.g., wherein a user is associated with login credentials which enable the collection of user data for that user across multiple devices and browsers).

According to implementations of the present disclosure, user action data may include any data associated with a user's electronic actions or activity including, but not limited to, page visits, clicks on a widget or application, scrolling of webpage sections, pointing device (e.g., mouse or keyboard) movements, clicks or other indications, a time of activity on a webpage and/or web site, a listing of web sites visited by a user, languages a user reads, special interest indicators such as "like" indications or "dislike" indications, user explicit data such as categories, etc.

According to implementations, user non-action data includes passively generated data including, but not limited to, social data associated with a user from a social network, viewing a content link (e.g., a content recommendation) but not interacting with the link, other personal data associated with the user, etc.

According to implementations, user property data includes properties associated with a user including, but not limited to, a geographic location of a user, document properties associated with documents viewed by a user (e.g., document categories, document size, estimated document reading time), content type or format (e.g., video, slideshows, audio, articles, games, etc.), etc. The user property data collected by the content recommendation module 200 may further include registration information, personal information, and/or demographic information pertaining to users and/or groups of users (e.g., age of user groups, geographic location of user groups) and may store the information in one or more data stores (e.g., hard disks, memories, databases, etc.). In situations in which the implementations discussed herein collect personal information and/or demographic about users, or may make use of personal information and/or demographic information, the user may be provided with an opportunity to control whether the content recommendation system 140 is allowed to collect the information (e.g., information about a user's social network, social actions or activities, profession, a user's preferences, or a user's current location), or to control whether and/or how to receive content from the content sharing platform that may be more relevant to the user. In addition, certain data may be treated in one or more ways before it is stored or used, so that personally identifiable information is removed. Thus, the user may have control over how, when, and what type of information is collected about the user and used by the content recommendation system 140. In an implementation, user actions are tracked using a user tracking cookie in order to identify user action data, user non-action data, and/or user property data.

Figure 2:
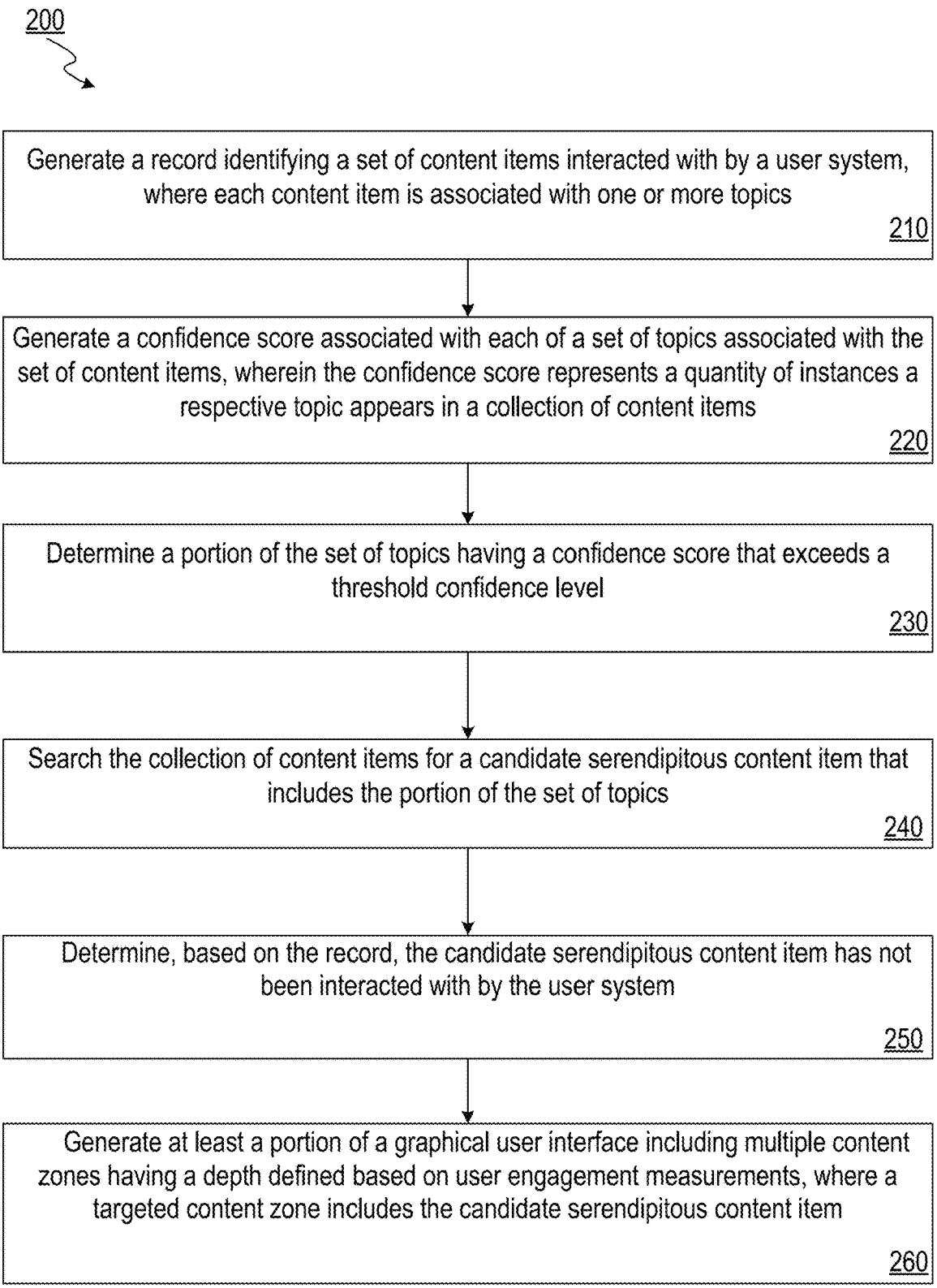
FIG. 2 is a flow diagram of an implementation of a method for provisioning serendipitous content recommendations in a targeted content zone, in accordance with one or more embodiments of the present disclosure.

FIG. 2 is a flow diagram of an exemplary implementation of a method 200 for provisioning a content item (e.g., a serendipitous content item) to a targeted zone of a content feed displayed via a document on a user device. The method 200 may be performed by processing logic that may comprise hardware (circuitry, dedicated logic, etc.), software (such as is executed on a computer system or a dedicated machine), or a combination of both. In an implementation, the method 200 may be performed by the content recommendation system 140 of FIG. 1.

In operation 210, the processing logic generates a record identifying a set of content items interacted with by a user system, where each content item is associated with one or more topics. In an embodiment, the record (e.g., a user profile) can be maintained for a user based on previous interactions (e.g., consumption actions such as clicking, reading, scrolling, etc.).

In operation 220, the processing logic generates a confidence score associated with each of the one or more topics associated with the set of content items. In an embodiment, the confidence score represents a quantity of instances a respective topic appears in a collection of content items. In an embodiment, the processing logic aggregates data from multiple different publisher systems indicating a count or quantity of instances that each topic appears in a content item in the collection of content items. In an embodiment, the quantity of instances can be normalized to generate a confidence score that represents a relative level or amount of times (e.g., instances) one topic appears in the content network versus a relative level or amount of times another topic appears in the content network. In an embodiment, the processing logic identifies the one or more topics associated with each content item in the collection of content items (also referred to as a content network) and generates a confidence score for each topic.

FIG. 4 illustrates a table including a content network corresponding to a set of content items (e.g., content item 1 and content item 2 of FIG. 3) interacted with by a first user. In the table, the content item topics (e.g., content item topic 1 through content item topic 10) are identified and extracted from the content items of the content network. For each content item topic, the processing logic determines a confidence score (e.g., in a range of 0 to 100, with 100 representing a highest level of confidence associated with the topic).

In operation 230, the processing logic determines a portion of the set of topics having a confidence score that exceeds a threshold confidence level. In an embodiment, a threshold confidence score can be established in the content recommendation system for use in comparing the confidence scores of the identified topics associated with a user profile. In the example shown in FIG. 4, the threshold confidence score or level is 85. As shown in this example, the portion of the set of topics having a confidence score that exceeds the threshold confidence level includes content item topic 2 and content item topic 6. In an embodiment, the set of topics having a confidence score that exceeds the threshold confidence level are tagged, marked or referred to high confidence score topics, as indicated in the table shown in FIG. 4.

In operation 240, the processing logic searches the collection of content items for a candidate serendipitous content item that includes a portion of the set of topics. In an embodiment, the search is intended to identify a content item (e.g., an article, a video file, an image, a podcast, etc.) that includes multiple high confidence content item topics. In the example shown in FIGS. 3 and 4, the processing logic searches the collection of content items and identifies content item 32 which includes both of the high confidence topics (e.g., topic 2 and topic 6). For example, topic 2 (identified in connection with content item 1) may be "Star Wars" and topic 6 (identified in connection with content item 2) may be "Chess". In this example, content item 32 may be an article relating to a Star Wars themed chess set.

In operation 250, the processing logic determines, based on the record, the candidate content item has not been interacted with by the user system. In an embodiment, the processing logic can determine that the identified candidate content item is "new" to the user system by reviewing the historical record of interactions by the user system. In the example shown in FIGS. 3 and 4, the processing logic can review the record associated with a user and determine that content item 32 (e.g., the article relating to the Star Wars chess set). In an embodiment, the candidate content item is compared to the historical record of interactions (e.g., consumption actions such as clicking, reading, sending a link, purchasing, receiving a link, etc.) to see if the candidate content item has been interacted with by the user.

In operation 260, the processing logic generates at least a portion of a graphical user interface including multiple content zones having a depth defined based on user engagement measurements, where a targeted content zone includes the candidate serendipitous content item. In an embodiment, the processing logic establishes multiple layered zones for a content feed of content recommendations. In an embodiment, the graphical user interface of a user system accesses a document of a publisher system (e.g., a webpage accessed via a user device). In an embodiment, operation 260 is performed in response to a request by the user system to access a document including the content feed. For example, the user system can, using a web browser or interacting with an application, access a document including the content feed that is configured with the multiple content zones including a targeted content zone displaying the candidate serendipitous content item.

In an embodiment, the processing logic identifies and establishes multiple different content zones for provisioning a content feed of multiple content recommendations. In an embodiment, the content zones (e.g., portions of the graphical user interface) are identified in view of a set of user engagement signals. The user engagement signals include feedback from one or more uses of a level of engagement the user has with the corresponding content in each zone.

In an embodiment, the processing logic identifies a first type or category of content items for a first content zone of the content feed, a second type or category of content items for a second content zone of the content feed, and so on. The processing logic identifies one of the multiple content zones (e.g., content zone 3 of FIGS. 5 and 6) as a targeted or serendipity zone for provisioning the one or more candidate content items, as identified in operation 250.

In an embodiment, the targeted content zone is a portion of the content feed that has a starting point (e.g., a starting depth) that is identified based on a measured level of user engagement signals that satisfy a targeted content zone condition. In an embodiment, the targeted content zone condition can be satisfied when a measured level of user engagement signals is less than a threshold level of user engagement. In an embodiment, the targeted content zone condition can be satisfied when a rate of change of the measured level of user engagement signals decreases at a rate that exceeds a threshold rate of change of user engagement. Advantageously, a start point of the targeted zone can be identified that corresponds with a decrease or diminishment of user engagement, thereby defining a depth of the content feed that represents an opportunity to "surprise" the user with the candidate content item (e.g., the targeted or serendipitous content item) to increase user engagement as compared to the measured user engagement level previously associated with this content feed depth.

Figure 5:
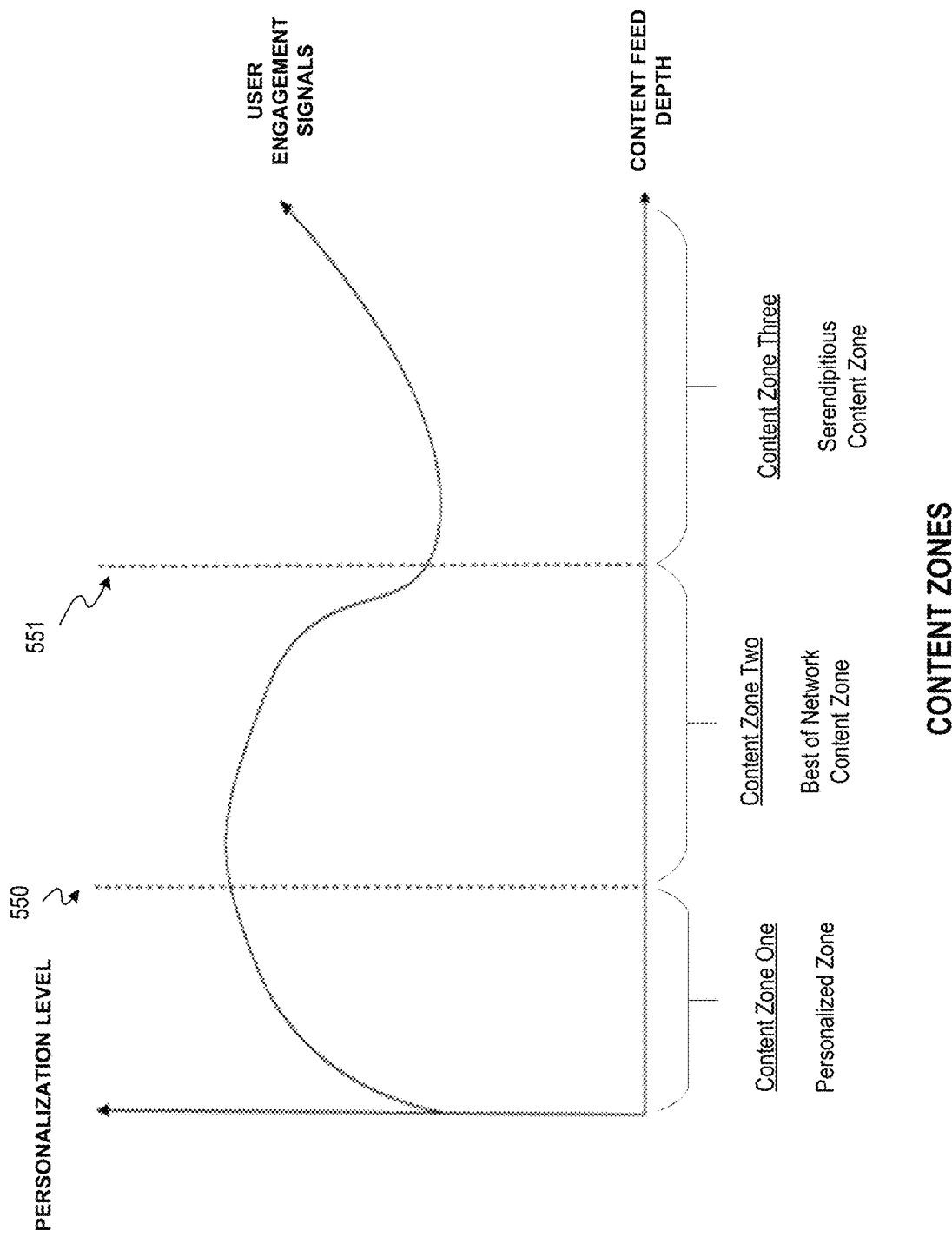
FIG. 5 is a graph illustrating a level of personalization corresponding to multiple content zones of a content feed, in accordance with one or more embodiments of the present disclosure.
Figure 6:
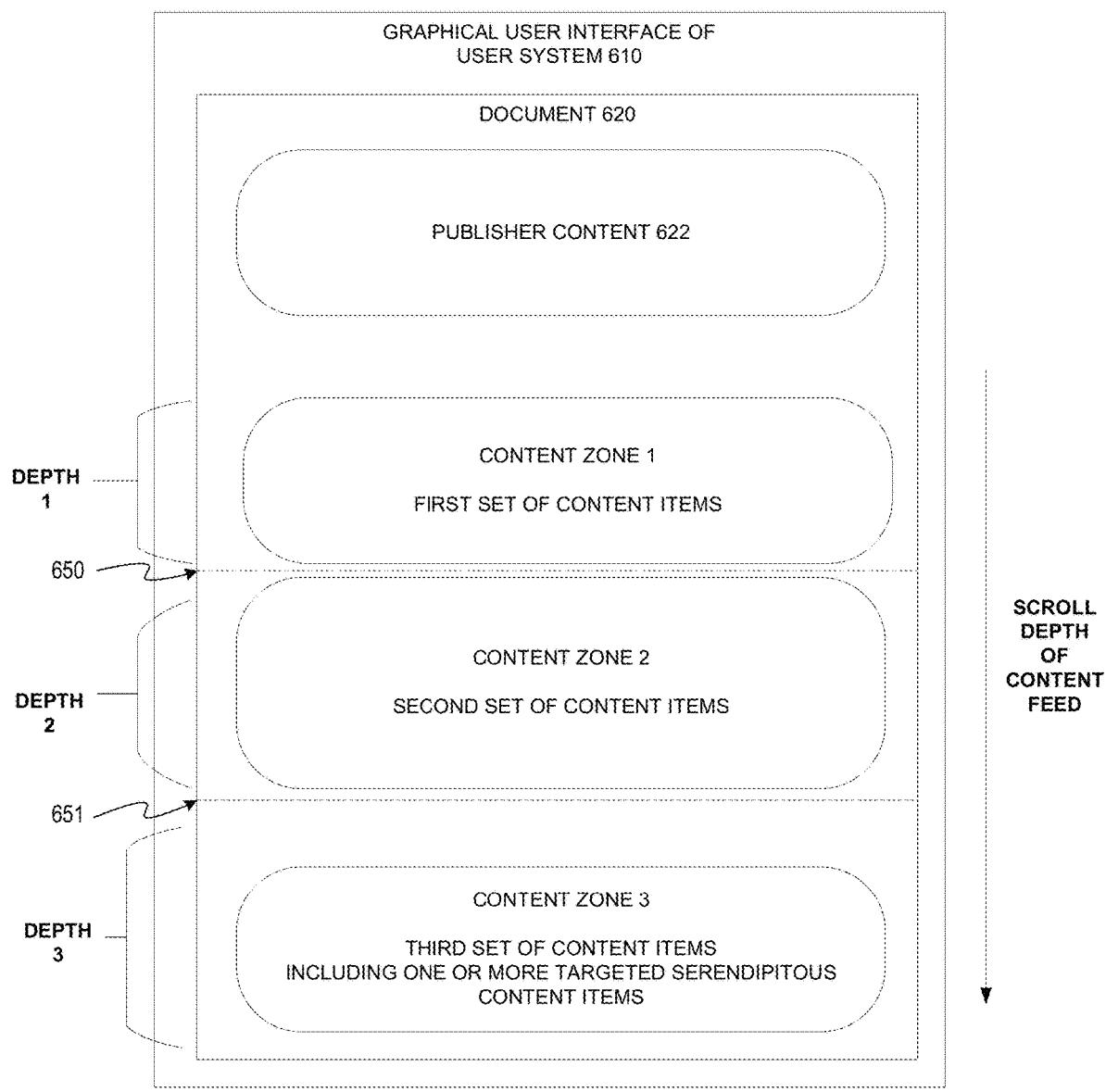
FIG. 6 illustrates an example graphical user interface of a user device including multiple content zones and recommended content items generated by a content recommendation system, in accordance with one or more embodiments of the present disclosure.

In an embodiment, the processing logic identifies the multiple different content zones for provisioning different types of content. As shown in the example of FIG. 5, the multiple content zones include content zone one, content zone two and content zone three. Each content zone is assigned a size or depth and includes a zone start point and zone end point or transition. In an embodiment, a first content zone (e.g., directed to a portion of the content feed from a top of the content feed location to a first zone end point. For example, as shown in FIG. 6, content zone one has a depth (e.g., Depth 1) extending over a portion of the content feed from a content feed start point to a first zone end point 650. In an embodiment, the first zone end point is identified by the processing logic based on the user engagement signals. In an embodiment, the first zone end point may be identified as a point within the content feed depth where the user engagement signals rate of increase is less than a threshold level of increase. In an embodiment, the first content zone can be designated for provisioning of personalized content items. In an embodiment, the personalized content items can be identified by reviewing a collection of content items and comparing to information of a user profile of the user system. The first zone end point can further serve as a starting point for the subsequent content zone (e.g., content zone two of FIGS. 5 and 6).

In an embodiment, a second content zone is defined by the processing logic, where the second content zone is designated for a second type or category of content items (e.g., a type of content items that is different than the content item type of the preceding content zone). In an embodiment, a zone end point for the second content zone is identified by the processing logic based on the user engagement signals. In an embodiment, the second zone end point may be identified as a point within the content feed depth where the user engagement signals rate of decrease is greater than a threshold level of decrease. In an embodiment, the second content zone can be designated for provisioning best of network content items. In an embodiment, the best of network content items can be identified by reviewing a collection of content items and establishing a set of content items having a confidence score that exceeds a threshold confidence score level. The first zone end point can further serve as a starting point for the subsequent content zone (e.g., content zone two of FIGS. 5 and 6).

FIG. 6 illustrates an example graphical user interface 610 accessing a document 620 including publisher content 622 and multiple content zones (e.g. content zone 1, content zone 2, and content zone 3) for displaying a content feed as established by the content recommendation system of the present disclosure. The content feed has a scroll depth wherein content zone 1 has a first depth (e.g., Depth 1), content zone 2 has a second depth (e.g., Depth 2) and content zone 3 (e.g., the targeted serendipity zone) has a third depth (e.g., Depth 3).

As shown, the targeted serendipitous zone is established as content zone 3 and has a starting point 651 within the scroll depth of the content feed. The starting point 651 also represents an end point of the preceding content zone. In an embodiment, the starting point 651 of the targeted zone is identified based on the user engagement signals collected in connection with the content network. In the example of FIG.

5, the starting point 551 of the targeted content zone is identified as a depth where the user engagement signals decrease at a rate that exceeds a threshold rate or level of decrease. In the example of FIG. 6, content zone 3 is configured to display the third set of content items including one or more targeted serendipitous content items (e.g., the candidate content item identified in operation 260 of FIG. 2). It is noted that, although three content zones are identified in the example shown in FIG. 6, any number of content zones (e.g., two, three, four, etc.) can be established, such that a targeted content zone is established for provisioning the targeted content items.

In an embodiment, the depth corresponding to the start of the targeted content zone can be determined based on the set of user engagement signals collected by the content recommendation system. In an embodiment, historical user engagement signals collected with respect to a document can be analyzed to identify a depth having a user engagement signal value that satisfies a condition. For example, the user engagement signal values (as shown in the graph of FIG. 5) can be analyzed to identify a depth (e.g., depth 551 of FIG. 5) that has a rate of decrease that exceeds a threshold level. That rate of decrease can indicate a fall off of user engagement at the corresponding scroll depth, and as such, is identified by the content recommendation system as an appropriate location to set the start or top of the targeted serendipitous content zone for provisioning the one or more targeted or serendipitous content items.

According to an implementation, a general grade may be generated for the set of all possible content recommendations in the pool based on one or more of a prior grade associated with the particular content recommendation and a user engagement measurement (e.g., CTR). In an embodiment, a prior grade is generated for every content recommendation. In an implementation, one or more content recommendations may be preselected based on previous performance in the network. In an implementation, a content recommendation's prior grade may represent an estimate of how well a content recommendation may perform in the future.

In an embodiment, grades in each content recommendation pool are normalized between sources. For example, a set of content recommendations may be generated, each with a prior grade and the set of "features" it was selected for (e.g., eography, category, source, etc.). Each document may also be tagged with a plurality of content recommendation pool metadata tags that can be used by the system to quickly generate new combinations and categories of content recommendation pools.

In an implementation, the general grade is based on an online-CTR for a particular content recommendation derived from aggregated user data associated with the network. In an embodiment, the current grade for a content recommendation is a combination of the prior grade and the actual CTR. The general grades may be personalized by assigning weights to the content recommendation pools in proportion to the user profile interest data that matches those pools. For example, if a user consistently chooses "evergreen" content over CTR driven content, the user may be associated with an "evergreen" content recommendation pools as a source of potential content recommendation candidates.

According to implementations of the present disclosure, personal information associated with a particular user (e.g., one or more personal weights/constraints) may be considered in order to generate a personalized grade for a particular user. In implementations, the personalized grade may be an update, change, adjustment, re-calculation of the general grade in view of the personal information associated with the particular user. In an implementation, an actual CTR may be calculated for each content recommendation in the source. The actual CTR may then be combined with a prior grade associated with the content recommendation. In an embodiment, the user profile may be identified based on the cookie information or the user registration information or both. The grade for a content recommendation may then be re-graded or re-calculated in view of the user profile information.

In an implementation, one or more content recommendation scopes may be generated to constrain the re-graded content recommendations for each user. According to implementations of the present disclosure, a content recommendation scope is a content recommendation filter that presents the user with content recommendations conforming to the user's chosen scopes (also referred to as "scoped content recommendations"). In an implementation, the content recommendations may be filtered by one or more content recommendation scope parameters, such as, for example, by features the content recommendation was selected by (e.g., categories the user saw, user geographic location, scope preferences explicitly chosen or dismissed by the user, etc.).

In an implementation, a content recommendation may be filtered by its properties (e.g., categories, the content recommendation pool it came from, sources), the user properties (e.g., categories, geographic location, sources) and/or the current content recommendation scope the user is located within (e.g., information associated with a current web site or document that the user is consuming).

In an implementation, a "relevance-to-user" measure associated with a particular content recommendation may be assigned on a per user basis to multiple users, for example, based on the best CTR/RPM in a user cluster from its profile. In an embodiment, a personalized grade may be represented by the following expression:

personal_grade=relevance_to_user*general_grade

According to an implementation of the present disclosure, content recommendations are then served to users in proportion to their personalized grades, as filtered by the user's content recommendation scopes.

In an embodiment, the content recommendation system creates and/or identifies personalized content recommendations (e.g., for content zone 1) by building multiple pools of high-quality content recommendation candidates (e.g., candidate content recommendations may be considered "high-quality" based on a measure of a previously determined click-through-rate (CTR) and the features they best represent).

In an embodiment, the best of network or optimized content recommendations in the content network are aggregated into a plurality of sets of content recommendation candidate pools, each pool being distinguished or classified based on a "user trust measurement" or a "user trust measures" or a "long-term user trust measurement", such as, for example, a user engagement measure, a high content recommendation quality metric, or based on a document property (e.g., the type or category of the document).

In an implementation, qualitative user trust measures may be determined based on one or more user trust signals identified at one or more of the following levels: a user level (e.g., based on the user profile, user action or activity history, an associated user cluster, etc.); a document level (e.g., a trustworthiness associated with the document, whether the document is considered evergreen content, etc.); and a source or context level (e.g., which section of a website the document appears in, a category associated with publisher source, a publisher, a language, a time of day, a day of the week, etc.).

In an implementation, the user trust measures may include, but are not limited to, one or more of the following: on-page user behavior events like scrolling and duration; average duration of user sessions on a content publisher's website; the number of documents/articles the user has viewed per session; the number of comments on an article; the percentage of article comments read by users; the number of return visits by the user to the content publisher's website over time in association with clicks by the user on the content recommendations provided on the content publisher's website; an indicator of content sharing by the user (e.g., copying the document's/article's URL by the user or clicking on the article's "share" button); a measure of the CTR associated with a document; the number of reads to end of article; an "evergreen" content recommendation associated with each document category; a best CTR by location; the number of document content recommendations or "likes" by other users, etc.

In an implementation, the content recommendation system creates sets of pools of high-quality content recommendation candidates, each pool being associated with a long-term user trust measurement. From the list of these sets of content recommendation candidate pools the system may match and choose suitable content recommendation candidates for each user profile. Advantageously, a scalable platform is provided for experimentation with different content recommendation candidate pools in order to increase long-term user trust and engagement. The network-wide dispersal of the resulting content recommendation impressions affords valuable feedback and data on the quality of the content recommendations that can be used by the content recommendation service provider to further enrich and optimize the candidate content recommendation pools.

In one implementation, from a network-wide "allow list" of content sources (i.e., content cleared by publishers for sharing on the content recommendation network), multiple types of high-quality candidate content recommendation pool sets may be generated. Such candidate content recommendation pool sets can include user trust signals or attributes that can be used to identify and cluster documents into the pool sets. Exemplary user trust signals or attributes may include: one or more "evergreen" content recommendations worldwide in English having a highest relative user engagement measure (e.g., CTR, maintaining user interest over a long time period); content recommendations with the highest relative CTR for a particular geographic location and language; content recommendations with the highest relative CTR for a category and language; content recommendations with the highest relative CTR or RPM in a user cluster; content recommendations that have been allocated differing user trust thresholds for different classifications of users (e.g., classification of users by interests); and trending topics for a specific geographic location.

Figure 7:
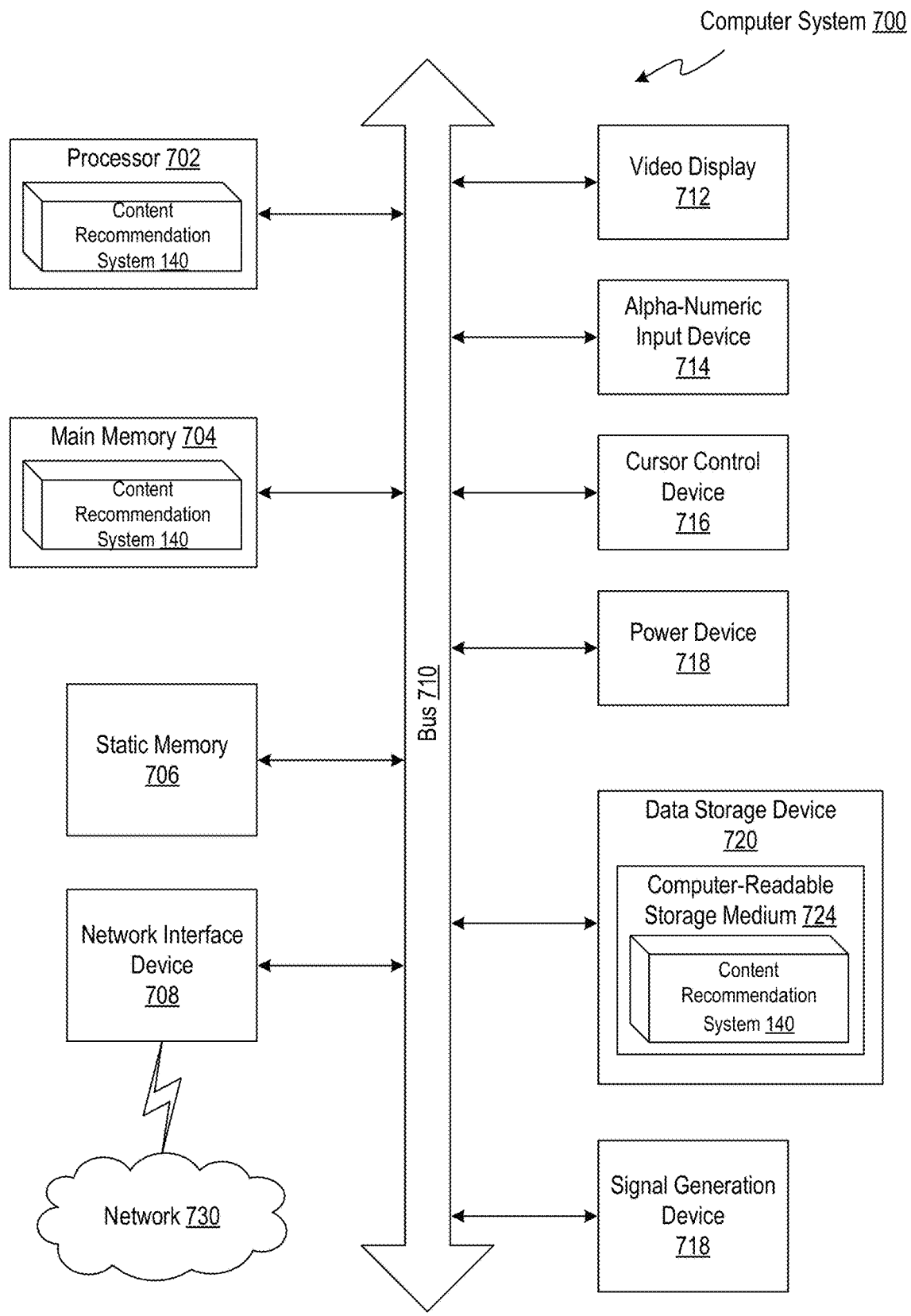
FIG. 7 is a block diagram of an example computer system that may perform one or more of the operations described herein, in accordance with one or more embodiments of the present disclosure.

FIG. 7 is a block diagram of an example computer system 700 that may perform one or more of the operations described herein, in accordance with various implementations. In alternative implementations, the machine may be connected (e.g., networked) to other machines in a LAN, an intranet, an extranet, or the Internet. The machine may operate in the capacity of a server or a client machine in client-server network environment, or as a peer machine in a peer-to-peer (or distributed) network environment. The machine may be a personal computer (PC), a tablet PC, a set-top box (STB), a Personal Digital Assistant (PDA), a cellular telephone, a digital watch, a web appliance, a server, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 700 includes a processing device (e.g., a processor) 702, a main memory 704 (e.g., read-only memory (ROM), flash memory, dynamic random access memory (DRAM) such as synchronous DRAM (SDRAM), double data rate (DDR SDRAM), or DRAM (RDRAM), etc.), a static memory 706 (e.g., flash memory, static random access memory (SRAM), etc.), and a data storage device 714, which communicate with each other via a bus 710.

Processor 702 represents one or more general-purpose processing devices such as a microprocessor, central processing unit, or the like. More particularly, the processor 702 may be a complex instruction set computing (CISC) microprocessor, reduced instruction set computing (RISC) microprocessor, very long instruction word (VLIW) microprocessor, or a processor implementing other instruction sets or processors implementing a combination of instruction sets. The processor 702 may also be one or more special-purpose processing devices such as an application specific integrated circuit (ASIC), a field programmable gate array (FPGA), a digital signal processor (DSP), network processor, or the like. The processor 702 is configured to execute instructions associated with the content recommendation system 140 for performing the operations and steps discussed herein.

The computer system 700 may further include a network interface device 708. The computer system 700 also may include a video display unit 712 (e.g., a liquid crystal display (LCD) or a cathode ray tube (CRT)), an alphanumeric input device 714 (e.g., a keyboard), a cursor control device 716 (e.g., a mouse), and a signal generation device 718 (e.g., a speaker).

The data storage device 720 may include a computer-readable storage medium 724 on which is stored one or more sets of instructions (e.g., software) embodying any one or more of the methodologies or functions associated with the content recommendation system 140, as described herein. The instructions may also reside, completely or at least partially, within the main memory 704 and/or within the processor 702 during execution thereof by the computer system 700, the main memory 704 and the processor 702 also constituting computer-readable storage media. The instructions may further be transmitted or received over a network 730 via the network interface device 708.

In one implementation, the instructions include instructions for content recommendation system 140 and/or a software library containing methods that call the optimization module. While the computer-readable storage medium 724 (machine-readable storage medium) is shown in an exemplary implementation to be a single medium, the term "computer-readable storage medium" should be taken to include a single medium or multiple media (e.g., a centralized or distributed database, and/or associated caches and servers) that store the one or more sets of instructions. The term "computer-readable storage medium" shall also be taken to include any medium that is capable of storing, encoding or carrying a set of instructions for execution by the machine and that cause the machine to perform any one or more of the methodologies of the present disclosure. The term "computer-readable storage medium" shall accordingly be taken to include, but not be limited to, solid-state memories, optical media, and magnetic media.

In the foregoing description, numerous details are set forth. It will be apparent, however, to one of ordinary skill in the art having the benefit of this disclosure, that the present disclosure may be practiced without these specific details. In some instances, well-known structures and devices are shown in block diagram form, rather than in detail, in order to avoid obscuring the present disclosure.

Some portions of the detailed description have been presented in terms of algorithms and symbolic representations of operations on data bits within a computer memory. These algorithmic descriptions and representations are the means used by those skilled in the data processing arts to most effectively convey the substance of their work to others skilled in the art. An algorithm is here, and generally, conceived to be a self-consistent sequence of steps leading to a desired result. The steps are those requiring physical manipulations of physical quantities. Usually, though not necessarily, these quantities take the form of electrical or magnetic signals capable of being stored, transferred, combined, compared, and otherwise manipulated. It has proven convenient at times, for reasons of common usage, to refer to these signals as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the following discussion, it is appreciated that throughout the description, discussions utilizing terms such as "generating", "determining", "searching" "identifying", or the like, refer to the actions and processes of a computer system, or similar electronic computing device, that manipulates and transforms data represented as physical (e.g., electronic) quantities within the computer system's registers and memories into other data similarly represented as physical quantities within the computer system memories or registers or other such information storage, transmission or display devices.

For simplicity of explanation, the methods are depicted and described herein as a series of acts. However, acts in accordance with this disclosure can occur in various orders and/or concurrently, and with other acts not presented and described herein. Furthermore, not all illustrated acts may be required to implement the methods in accordance with the disclosed subject matter. In addition, those skilled in the art will understand and appreciate that the methods could alternatively be represented as a series of interrelated states via a state diagram or events. Additionally, it should be appreciated that the methods disclosed in this specification are capable of being stored on an article of manufacture to facilitate transporting and transferring such methods to computing devices. The term article of manufacture, as used herein, is intended to encompass a computer program accessible from any computer-readable device or storage media.

Certain implementations of the present disclosure also relate to an apparatus for performing the operations herein. This apparatus may be constructed for the intended purposes, or it may comprise a general-purpose computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions.

Reference throughout this specification to "one implementation" or "an implementation" means that a particular feature, structure, or characteristic described in connection with the implementation is included in at least one implementation. Thus, the appearances of the phrase "in one implementation" or "in an implementation" in various places throughout this specification are not necessarily all referring to the same implementation. In addition, the term "or" is intended to mean an inclusive "or" rather than an exclusive "or." Moreover, the words "example" or "exemplary" are used herein to mean serving as an example, instance, or illustration. Any aspect or design described herein as "exemplary" is not necessarily to be construed as preferred or advantageous over other aspects or designs. Rather, use of the words "example" or "exemplary" is intended to present concepts in a concrete fashion.

The terms "first", "second", "third", "fourth", etc. as used herein are meant as labels to distinguish among different elements and may not necessarily have an ordinal meaning according to their numerical designation. The term "set" can refer to one or more elements, items, components, values, members, parts, etc.

It is to be understood that the above description is intended to be illustrative, and not restrictive. Many other implementations will be apparent to those of skill in the art upon reading and understanding the above description. The scope of the disclosure should, therefore, be determined with reference to the appended claims, along with the full scope of equivalents to which such claims are entitled.

What is claimed is:

1. A system comprising:
   a memory comprising instructions; and
   a processing device operatively coupled to the memory, the processing device to execute the instructions to:
   generate a record identifying a set of content items interacted with by a user system, where each content item is associated with one or more topics;
   generate a confidence score associated with each of a set of topics associated with the set of content items, wherein the confidence score represents a quantity of instances a respective topic appears in a collection of content items;
   determine a portion of the set of topics having a confidence score that exceeds a threshold confidence level;
   search the collection of content items for a candidate serendipitous content item that comprises the portion of the set of topics;
   determine, based on the record, the candidate serendipitous content item has not been interacted with by the user system; and
   generate at least a portion of a graphical user interface including a plurality of content zones having a depth defined based on user engagement measurements, wherein the plurality of content zones comprises a targeted serendipitous content zone comprising the candidate serendipitous content item.

2. The system of claim 1, the processing device to execute the instructions to:
   cause a provisioning of the candidate serendipitous content item to be displayed in the targeted serendipitous content zone.

3. The system of claim 1, the processing device to execute the instructions to:

determine a depth value that satisfies a condition associated with the targeted serendipitous content zone; and
establish the depth value as a starting point of the targeted serendipitous content zone.

4. The system of claim 3, wherein the condition associated with the targeted serendipitous content zone comprises one or more user engagement signal values having a rate of decrease that exceeds a threshold rate of decrease.

5. The system of claim 1, wherein the processing device generates at least the portion of the graphical user interface including the targeted serendipitous content zone in response to a request by the user system to access a portion of a publisher system.

6. The system of claim 1, wherein the plurality of content zones further comprises a first content zone to display one or more personalized content recommendations and a second content zone to display one or more best of network content recommendations.

7. A method comprising:
generating, by a processing device, a record identifying a set of content items interacted with by a user system, where each content item is associated with one or more topics;
generating a confidence score associated with each of a set of topics associated with the set of content items, wherein the confidence score represents a quantity of instances a respective topic appears in a collection of content items;
determining a portion of the set of topics having a confidence score that exceeds a threshold confidence level;
identifying a candidate serendipitous content item that comprises the portion of the set of topics;
determining, based on the record, the candidate serendipitous content item has not been interacted with by the user system; and
in response to a request from the user system to access a document of a publisher system, causing a display of the candidate serendipitous content item in a targeted serendipitous content zone of the document.

8. The method of claim 7, further comprising:
collecting a set of user engagement signals corresponding to the document of the publisher system;
identifying, based on the set of user engagement signals, a depth value of the document corresponding to a rate of decrease of user engagement that exceeds a threshold level; and
establishing the depth value as a starting point for the targeted serendipitous content zone.

9. The method of claim 8, further comprising:
establishing one or more additional content zones to precede the targeted serendipitous content zone in a scroll depth of the document.

10. The method of claim 9, wherein the one or more additional content zones are configured to display one or more content items having a different type than the candidate serendipitous content item.

11. The method of claim 7, wherein identifying the candidate serendipitous content item that comprises the portion of the set of topics comprises searching the collection of content items.

12. The method of claim 7, wherein the document comprises a portion designated for a content feed, the content feed to comprise the targeted serendipitous content zone displaying the candidate serendipitous content item.

13. The method of claim 7, further comprising measuring a user engagement signal associated with an interaction by the user system with the candidate serendipitous content item.

14. A non-transitory computer-readable storage medium comprising executable instructions that, if executed by a processing device, cause the processing device to:
generate a record identifying a set of content items interacted with by a user system, where each content item is associated with one or more topics;
generate a confidence score associated with each of a set of topics associated with the set of content items, wherein the confidence score represents a quantity of instances a respective topic appears in a collection of content items;
determine a portion of the set of topics having a confidence score that exceeds a threshold confidence level;
search the collection of content items for a candidate serendipitous content item that comprises the portion of the set of topics;
determine, based on the record, the candidate serendipitous content item has not been interacted with by the user system; and
generate at least a portion of a graphical user interface comprising a plurality of content zones having a depth defined based on user engagement measurements, wherein the plurality of content zones comprises a targeted serendipitous content zone comprising the candidate serendipitous content item.

15. The non-transitory computer-readable storage medium of claim 14, the processing device to cause a provisioning of the candidate serendipitous content item to be displayed in the targeted serendipitous content zone.

16. The non-transitory computer-readable storage medium of claim 14, the processing device to:
determine a depth value that satisfies a condition associated with the targeted serendipitous content zone; and
establish the depth value as a starting point of the targeted serendipitous content zone.

17. The non-transitory computer-readable storage medium of claim 16, wherein the condition associated with the targeted serendipitous content zone comprises one or more user engagement signal values having a rate of decrease that exceeds a threshold rate of decrease.

18. The non-transitory computer-readable storage medium of claim 14, wherein the processing device generates at least the portion of the graphical user interface including the targeted serendipitous content zone in response to a request by the user system to access a portion of a publisher system.

19. The non-transitory computer-readable storage medium of claim 14, wherein the plurality of content zones further comprises a first content zone to display one or more personalized content recommendations and a second content zone to display one or more best of network content recommendations.

20. The non-transitory computer-readable storage medium of claim 14, wherein the candidate serendipitous content item comprises at least one of a webpage, a video file, an audio file, or an image.

* * * * *